(12) United States Patent
Sahinoglu et al.

(10) Patent No.: US 8,054,226 B2
(45) Date of Patent: Nov. 8, 2011

(54) METHOD FOR ESTIMATING LOCATION OF NODES IN WIRELESS NETWORKS

(75) Inventors: Zafer Sahinoglu, Arlington, MA (US); Ghulam M. Bhatti, Mansfield, MA (US); Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 248 days.

(21) Appl. No.: 12/502,829

(22) Filed: Jul. 14, 2009

(65) Prior Publication Data

US 2010/0248637 A1 Sep. 30, 2010

Related U.S. Application Data

(60) Provisional application No. 61/165,421, filed on Mar. 31, 2009.

(51) Int. Cl.
*G01S 3/02* (2006.01)

(52) U.S. Cl. ......................................... 342/451; 342/458
(58) Field of Classification Search .................. 342/451, 342/453, 457, 458; 455/67.11, 456.1, 457
See application file for complete search history.

(56) References Cited

U.S. PATENT DOCUMENTS

2007/0037588 A1\* 2/2007 Mohi et al. ................. 455/456.5
\* cited by examiner

*Primary Examiner* — Dao Phan
(74) *Attorney, Agent, or Firm* — Dirk Brinkman; Gene Vinokur (57) ABSTRACT

A method localizes a set of nodes in a wireless network that includes a target node having unknown location and a set of anchor nodes having known locations. The set of anchor nodes is partitioned into subsets of anchor nodes, wherein each subset has at least three anchor nodes. A distance from the target node to each of anchor nodes in each subset is measured, to estimate possible locations of the target node. A geometric constraint is applied to each estimated location to determine valid locations, which are then filtered to determine filtered locations. The filtered locations are averaged to determine an initial estimate of the location.

8 Claims, 7 Drawing Sheets

METHOD FOR ESTIMATING LOCATION OF NODES IN WIRELESS NETWORKS

RELATED APPLICATIONS

This Non-Provisional Patent Application claims priority to Provisional Patent Application 61/165,421, "Method for Estimating Location of Nodes in Wireless Networks," filed by Ghulam M. Bhatti on Mar. 31, 2009, incorporated herein by reference.

FIELD OF THE INVENTION

This invention relates generally to wireless sensor networks, and more particularly to estimating locations of the sensor nodes.

BACKGROUND

With ever-increasing popularity of low cost wireless sensor networks, the deployment of such networks in an increasing number of applications is becoming feasible. Wireless sensing and monitoring, resource tracking and management, environmental monitoring, defense and security related applications are only a few domains that offer a wide-ranging market for wireless sensor networks.

Many applications need the locations of the sensors to make sensor data meaningful. Given the fact that sensors are very low-cost devices, sensors typically do not include a global positioning system (GPS). Moreover, many sensors may operate in areas where GPS may not be effective or feasible, e.g., inside buildings and in urban environments.

A number of method are know for measuring two-way time of arrival of ranging signals, including arrival data fusion, time difference of arrival data fusion and angle of arrival data fusion. For a 2D location, at least three sensors are needed, and more for a 3D location.

Distances r between the nodes can be used to estimate their locations. A target node t estimates distances to anchor nodes n at know locations by solving $$\hat{r}_{1t}^2 = (x_1 - x_t)^2 + (y_1 - y_t)^2$$

$$\hat{r}_{2t}^2 = (x_2 - x_t)^2 + (y_2 - y_t)^2$$

$$\hat{r}_{nt}^2 = (x_N - x_t)^2 + (y_N - y_t)^2 \quad (1)$$

A common way to solve these equations uses an overdetermined non-linear system of equations, Sayed et al., "Network-based wireless location: challenges faced in developing techniques for accurate wireless location information," IEEE Signal Processing Magazine, vol. 22, no. 4, pp. 24-40). Rearranging terms, and assuming that target node 1 is at an origin $(x_1/y_1) = (0,0)$ without losing generality, these equations can be expressed in a matrix form as $$Hx = b, \quad (2)$$

where $$H = \begin{bmatrix} x_2 & y_2 \\ x_3 & y_3 \\ \ldots & \ldots \\ x_N & y_N \end{bmatrix},$$

$$b = \frac{1}{2} \begin{bmatrix} x_2^2 + y_2^2 - \hat{r}_{2t}^2 + \hat{r}_{1t}^2 \\ x_3^2 + y_3^2 - \hat{r}_{3t}^2 + \hat{r}_{1t}^2 \\ \vdots \\ x_N^2 + y_N^2 - \hat{r}_{Nt}^2 + \hat{r}_{1t}^2 \end{bmatrix}$$

and $$x = \begin{bmatrix} x_t \\ y_t \end{bmatrix}.$$

Figure 2:
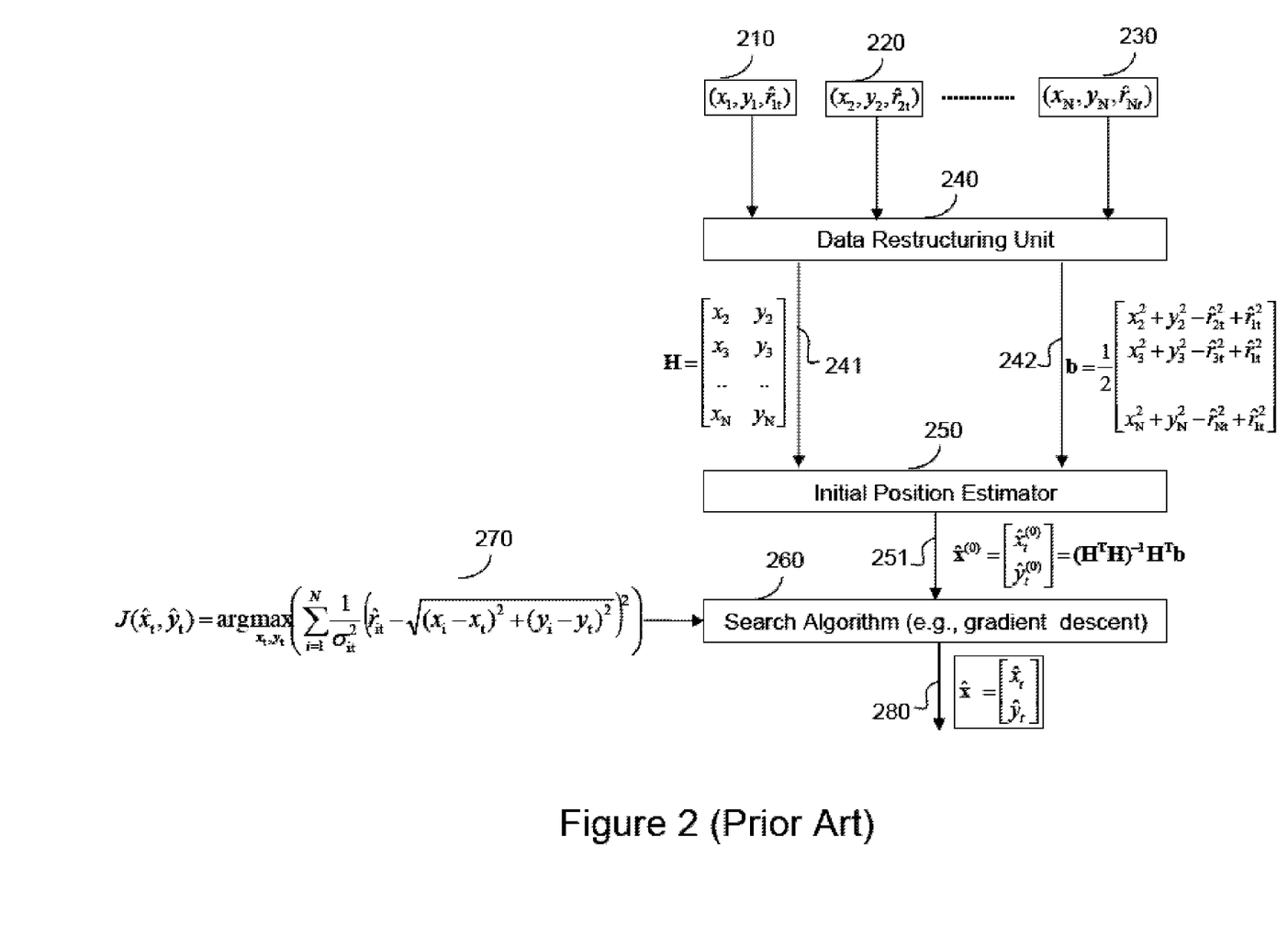
FIG. 2 is a block diagram of a conventional method for estimating locations of nodes.

As shown in FIG. 2, a conventional data restructuring unit 240 takes the coordinates of the locations of the anchor nodes and the measured ranges {210, 220, 230}, and determines H and b. Then, the initial position estimator 250 uses H and b to determine the initial target location using:

$$\hat{x}^{(0)} = \begin{bmatrix} \hat{x}_t^{(0)} \\ \hat{y}_t^{(0)} \end{bmatrix} = (H^T H)^{-1} H^T b, \quad (3)$$

where T is a transpose operator, and "^" indicates an estimate.

The initial location estimate $\hat{X}^{(0)}$ 251 is used to initialize an objective function 270

$$J(\hat{x}_t, \hat{y}_t) = \underset{x_t, y_t}{\mathrm{argmin}} \left( \sum_{i=1}^{N} \frac{1}{\sigma_{it}^2} \left( \hat{r}_{it} - \sqrt{(x_i - x_t)^2 + (y_i - y_t)^2} \right)^2 \right), \quad (4)$$

where a function max returns a maximum value, and $\sigma_{it}$ is the variance of the multiple range measurements between the target and anchor nodes.

After obtaining an initial estimate for the target location, a numerical search method can be used, e.g., gradient descent or a Gauss-Newton approximation. The search procedure 260 searches for the global minimum of the cost function 270 to estimate x.

Unreliable ranges may degrade accuracy of the location estimate, because those measurements are embedded in b. Therefore, unreliable ranges need to be eliminated. In addition, the computational complexity in computing the inverse of H in Equation (3) is high, when the number of anchors is greater than three.

SUMMARY OF THE INVENTION

The embodiments of the invention provide a method for accurately estimating locations of nodes in a wireless sensor network. The invention uses an initial set of three nodes for 2D location estimation, or four nodes for 3D location estimation. The modes are designated as anchor nodes after estimating their locations.

DETAILED DESCRIPTION OF THE PREFERRED EMBODIMENTS

The embodiments of our invention provide a method for estimating locations of nodes in a wireless network. In one embodiment, the nodes are sensors. The estimates are based on ranging signals transmitted by the nodes. The embodiments include estimating a location of a target node, converting the target node into an anchor node, and refining the location estimates after all target nodes are converted to anchor nodes.

Figure 1:
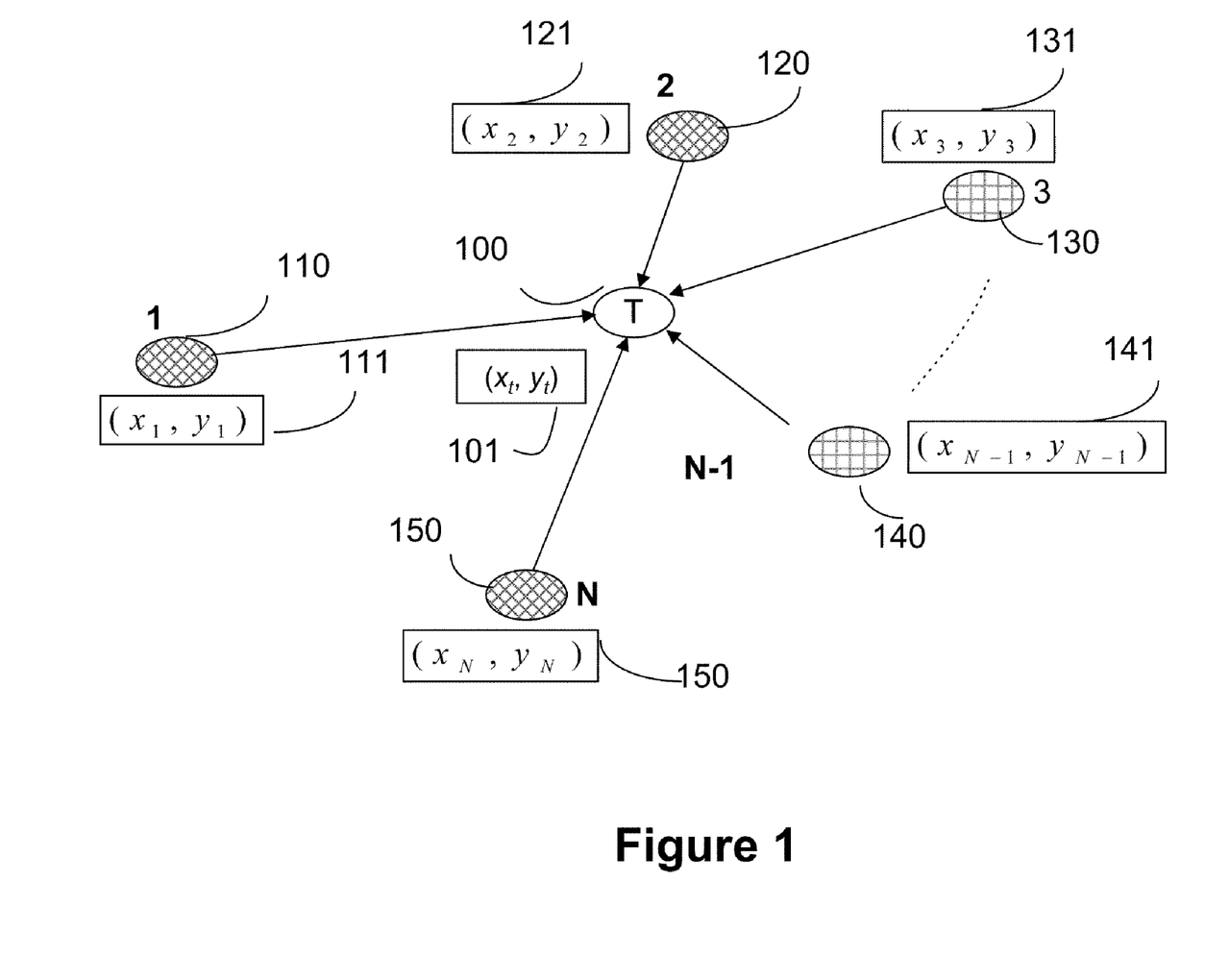
FIG. 1 is a schematic of a wireless network that uses embodiments of the invention.

As shown in FIG. 1, a target node (sensor) 100 is within the communication range of N anchor nodes {110, 120, 130, 140 150} at known locations $(x_i, y_i)$ 111, 121, 131, 141, and 151. The distances are used to estimate the unknown location $(x_t, y_t)$ 101 of the target node.

Estimating Location of a Target Node

Figure 3:
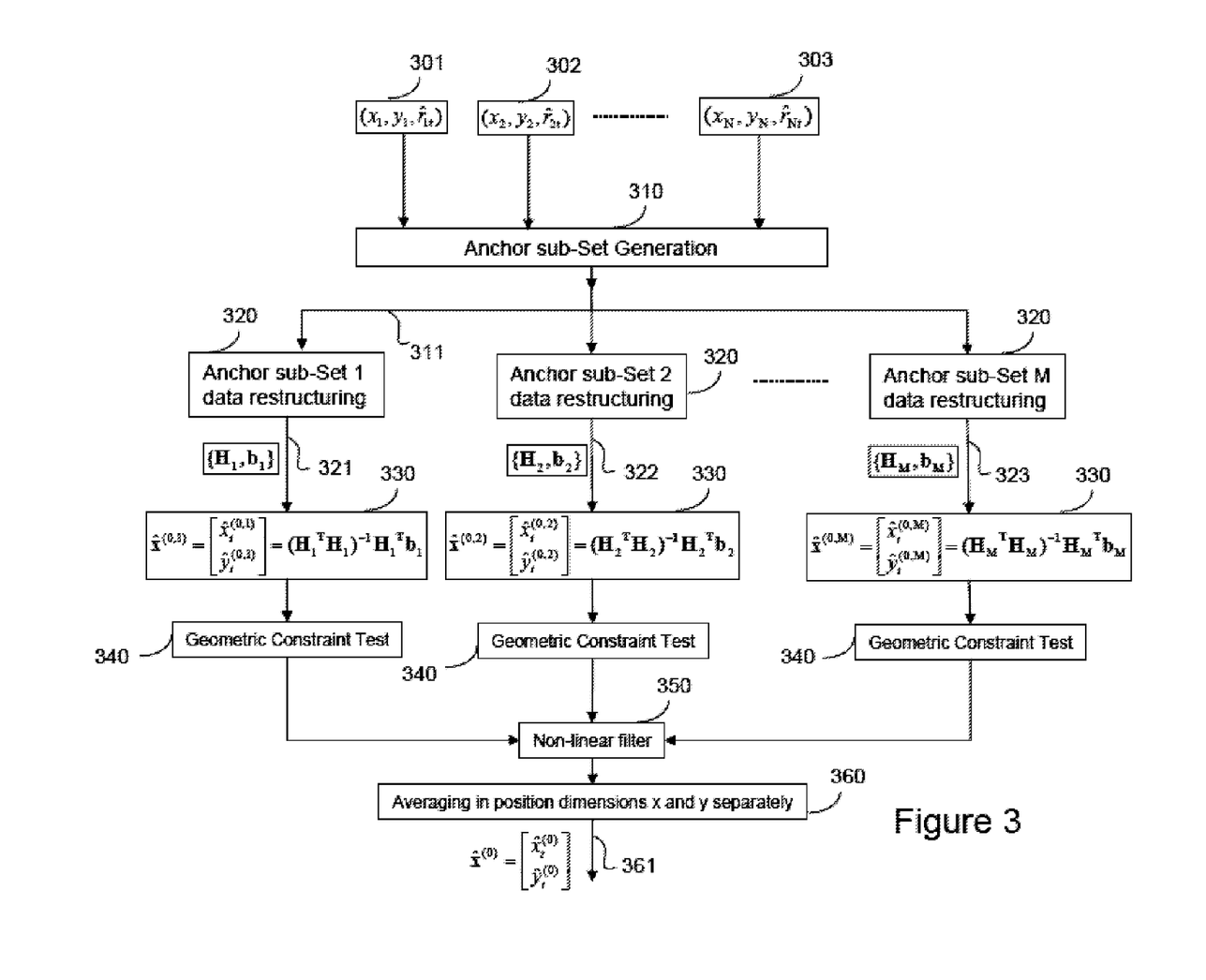
FIG. 3 is a block diagram of initial target location estimation according to embodiments of the invention.

There are N anchor nodes at known locations within communication range of the target node t, and the coordinates of the target are not known as shown in FIG. 1. The target node can make range measurements with each of the N anchors. Consider the 3-tuple $\{x_i, y_i, \hat{r}_{it}\}$ {301-303}. The variables the x and y are coordinates of anchor i, and the measured range between the target t and anchor i, respectively.

An anchor sub-set generation unit 310 forms unique anchor sub-sets 311 from the 3-tuples, such that each sub-set contains coordinates of the three anchors and corresponding distances between those anchors and the target. The number of anchor sub-sets is $$\binom{N}{3},$$

where N=3 or greater.

Figure 4:
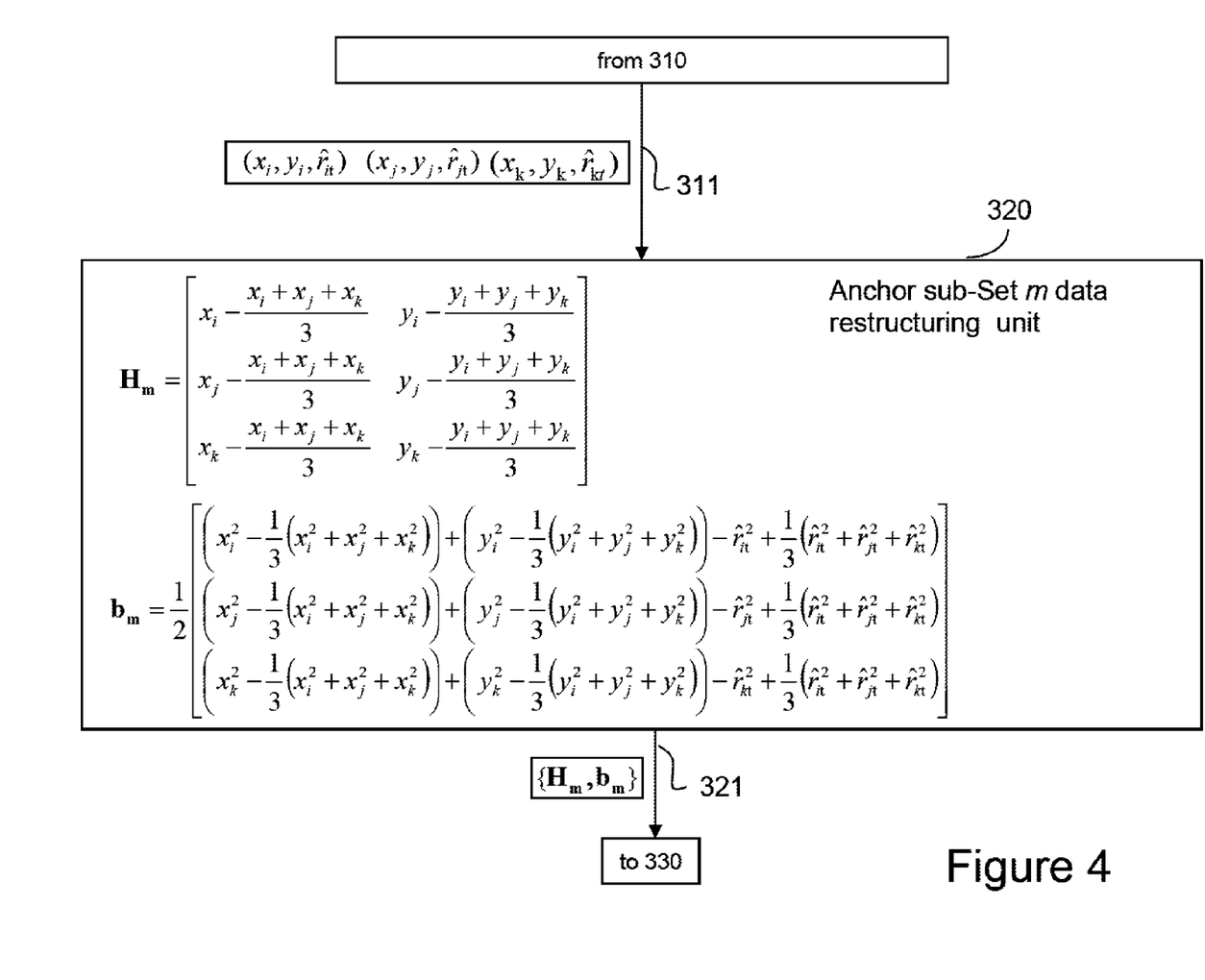
FIG. 4 is a block diagram of a set data restructuring unit according to embodiments of the invention.

The anchor subsets 311 $\{(x_i, y_i, \hat{r}_{it}), (x_j, y_j, \hat{r}_{jt}), (x_k, y_k, \hat{r}_{kt})\}$ for anchors i, $c_j$, $c_k$ are entered into the anchor sub-set data restructuring units 320 that determine $\{H_m, b_m\}$ {321-323} for subset m. Then, we estimate the initial location 330 of the target by using the anchor sub-set m according to $$\hat{x}^{(0,m)} = \begin{bmatrix} \hat{x}_t^{(0)} \\ \hat{y}_t^{(0)} \end{bmatrix} = (H_m^T H_m)^{-1} H_m^T b_m, \quad (5)$$

$$H_m = \begin{bmatrix} x_i - \frac{x_i+x_j+x_k}{3} & y_i - \frac{y_i+y_j+y_k}{3} \\ x_j - \frac{x_i+x_j+x_k}{3} & y_j - \frac{y_i+y_j+y_k}{3} \\ x_k - \frac{x_i+x_j+x_k}{3} & y_k - \frac{y_i+y_j+y_k}{3} \end{bmatrix}, \quad \text{and}$$

-continued $$b_m = \frac{1}{2}\begin{bmatrix} \left[ \left(x_i^2 - \frac{1}{3}\begin{pmatrix} x_i^2 + \\ x_j^2 + \\ x_k^2 \end{pmatrix}\right) + \left(y_i^2 - \frac{1}{3}\begin{pmatrix} y_i^2 + \\ y_j^2 + \\ y_k^2 \end{pmatrix}\right) - \hat{r}_{it}^2 + \frac{1}{3}\begin{pmatrix} \hat{r}_{it}^2 + \\ \hat{r}_{jt}^2 + \\ \hat{r}_{kt}^2 \end{pmatrix} \right] \\ \left[ \left(x_j^2 - \frac{1}{3}\begin{pmatrix} x_i^2 + \\ x_j^2 + \\ x_k^2 \end{pmatrix}\right) + \left(y_j^2 - \frac{1}{3}\begin{pmatrix} y_i^2 + \\ y_j^2 + \\ y_k^2 \end{pmatrix}\right) - \hat{r}_{jt}^2 + \frac{1}{3}\begin{pmatrix} \hat{r}_{it}^2 + \\ \hat{r}_{jt}^2 + \\ \hat{r}_{kt}^2 \end{pmatrix} \right] \\ \left[ \left(x_k^2 - \frac{1}{3}\begin{pmatrix} x_i^2 + \\ x_j^2 + \\ x_k^2 \end{pmatrix}\right) + \left(y_k^2 - \frac{1}{3}\begin{pmatrix} y_i^2 + \\ y_j^2 + \\ y_k^2 \end{pmatrix}\right) - \hat{r}_{kt}^2 + \frac{1}{3}\begin{pmatrix} \hat{r}_{it}^2 + \\ \hat{r}_{jt}^2 + \\ \hat{r}_{kt}^2 \end{pmatrix} \right] \end{bmatrix}$$

as shown in FIG. 4. Clearly, our formulation of $\{H_m, b_m\}$ is quite different from the prior art as in Eqn. (2).

As a result, $$\binom{N}{3}$$

location estimates are obtained for a single target.

Figure 5:
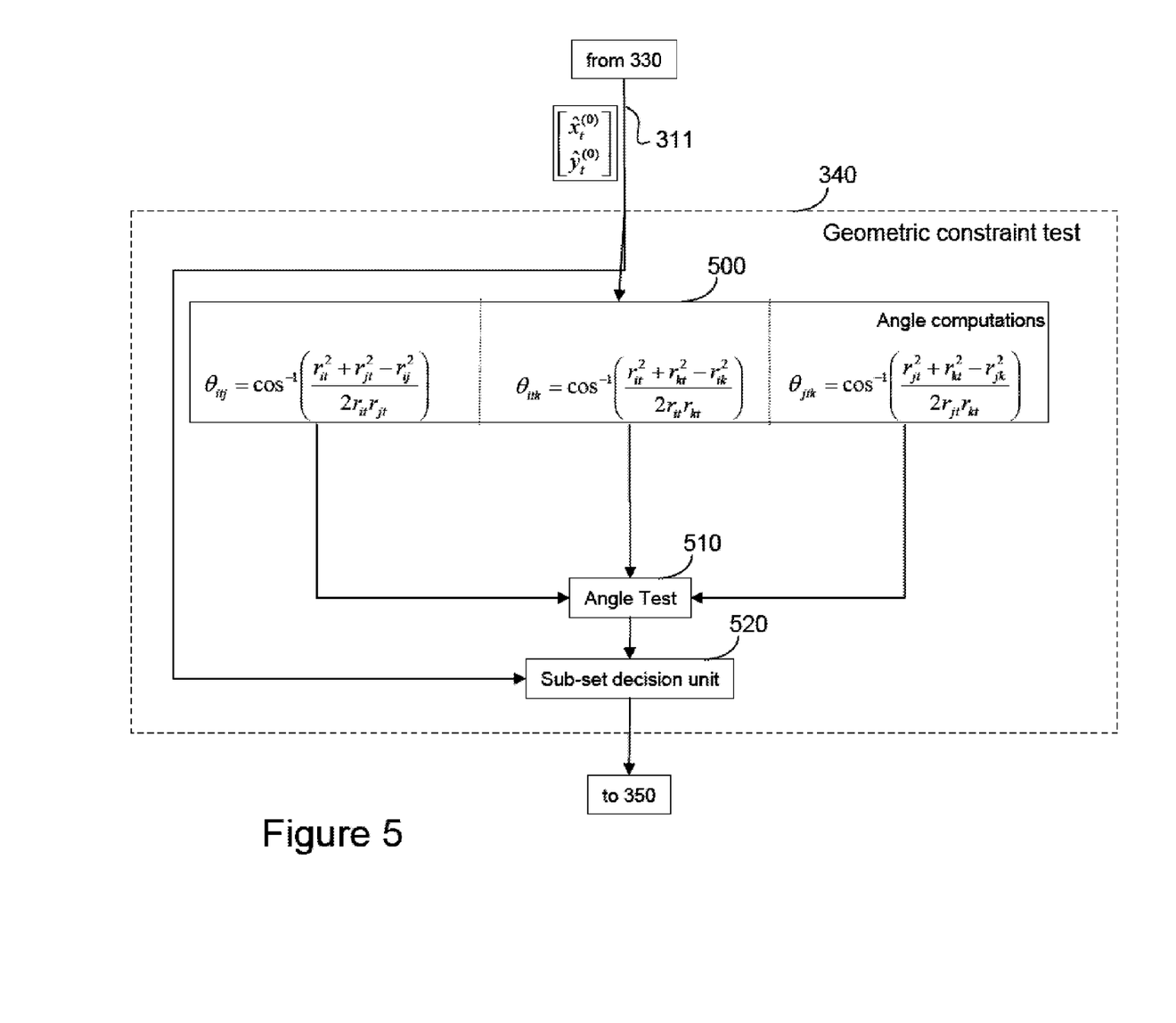
FIG. 5 is a block diagram of a geometric test unit according to embodiments of the invention.

A geometric constrain is applied to the estimated location based on the ranging distances to determine valid locations. The geometric constraint application 340 is shown in FIG. 5.

From the initial target location, and the locations of the anchors used in the subset m, the angles 500 between the targt 100 to the anchors are $$\theta_{itj} = \cos^{-1}\left(\frac{r_{it}^2 + r_{jt}^2 - r_{ij}^2}{2r_{it}r_{jt}}\right), \quad (6)$$

$$\theta_{itk} = \cos^{-1}\left(\frac{r_{it}^2 + r_{kt}^2 - r_{ik}^2}{2r_{it}r_{kt}}\right), \quad \text{and} \quad (7)$$

$$\theta_{jtk} = \cos^{-1}\left(\frac{r_{jt}^2 + r_{kt}^2 - r_{jk}^2}{2r_{jt}r_{kt}}\right), \quad (8)$$

where $r_{it}^2 = (x_i - \hat{x}_t^{(0,m)})^2 + (y_i - \hat{y}_t^{(0,m)})^2$. The angle test 510 compares each of the angles 500 to a predetermined threshold.

If any angle is smaller than the threshold γ, then the target and anchors form a geometry that is unreliable for location estimation. In this case, a subset decision unit 520 excludes the corresponding subset data from target location estimation, and only the valid locations are further processed. If the angle is greater than the predetermined threshold, the location is valid.

The valid target location estimates that pass the angle test are entered into a non-linear filter 350 to determine filtered locations. The non-linear filter can be implemented in various forms, including median filtering. The purpose of the non-linear filter 350 is to eliminate singular location estimates.

The valid filtered location estimates are averaged 360 to obtain the initial location estimate $$\hat{x}^{(0)} = \begin{bmatrix} \hat{x}_t^{(0)} \\ \hat{y}_t^{(0)} \end{bmatrix} 361$$

for the target node. Note that the coordinates of the locations are averaged independently.

Figure 6:
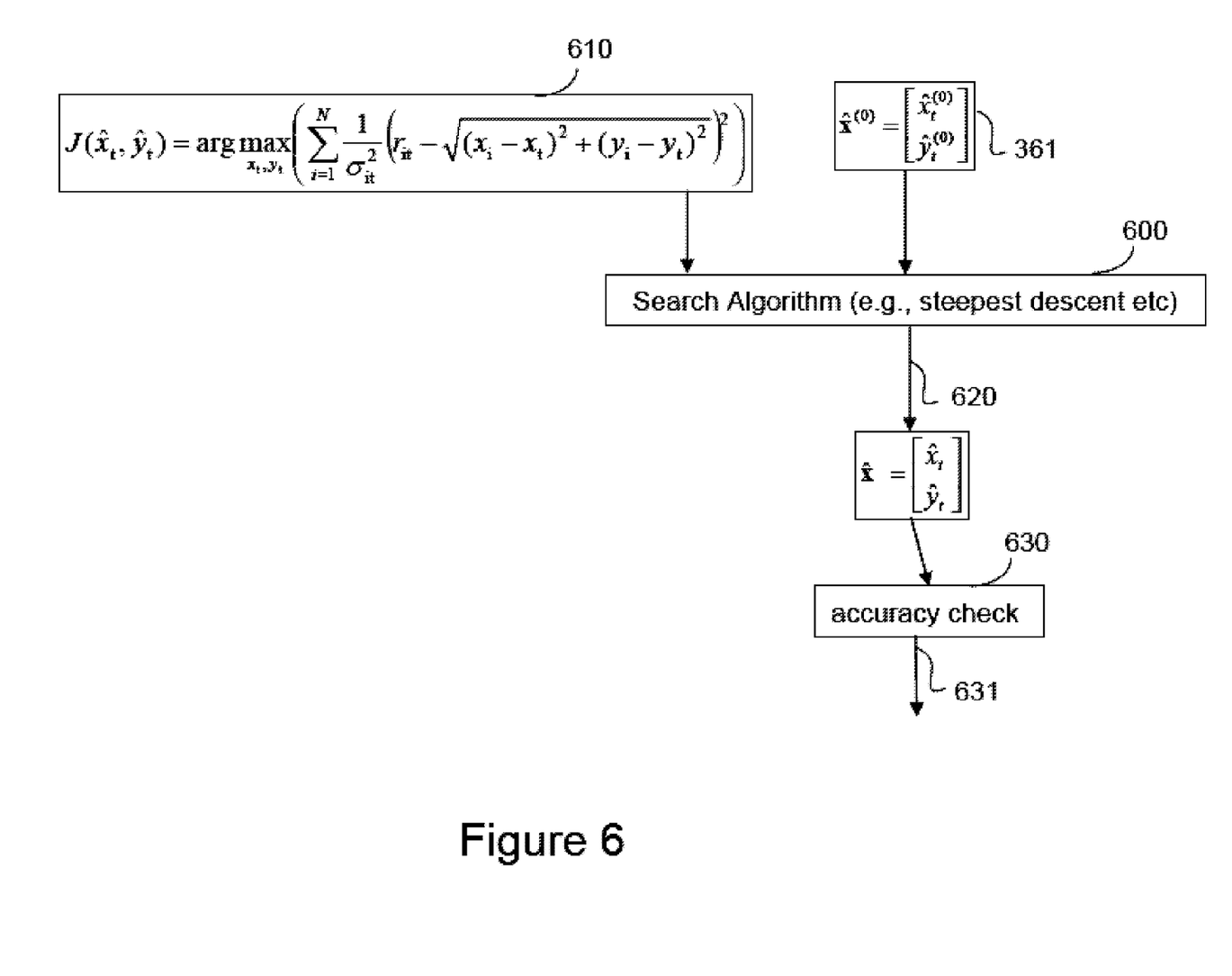
FIG. 6 is a block diagram of a process for initial location estimation and refinement according to embodiments of the invention.

As shown in FIG. 6, the initial location estimate 361 is used as a starting point in minimizing an objective function 610

$$J(\hat{x}_t, \hat{y}_t) = \underset{x_t, y_t}{\operatorname{argmin}} \left( \sum_{i=1}^{N} \frac{1}{\sigma_{it}^2} \left( r_{it} - \sqrt{\frac{(x_i - x_t)^2 +}{(y_i - y_t)^2}} \right)^2 \right). \quad (9)$$

A search procedure 600 is used to find the coordinates 620 of the target n using a global minimum of the objective function 610. The obtained target coordinates are the estimate of the location $$\hat{x} = \begin{bmatrix} \hat{x}_t \\ \hat{y}_t \end{bmatrix} 101$$

of the target node.

Converting to Anchor Node

We measure an accuracy $J_n(\hat{x}_t, \hat{y}_t)$ of the location $\hat{x}$ to ensure it satisfies the measured ranges between the target 100 and the N anchors.

If multiple target nodes are within the range of a required number of anchors, then we tentatively localize all of the targets, and then select the target with the minimum accuracy score.

Figure 7:
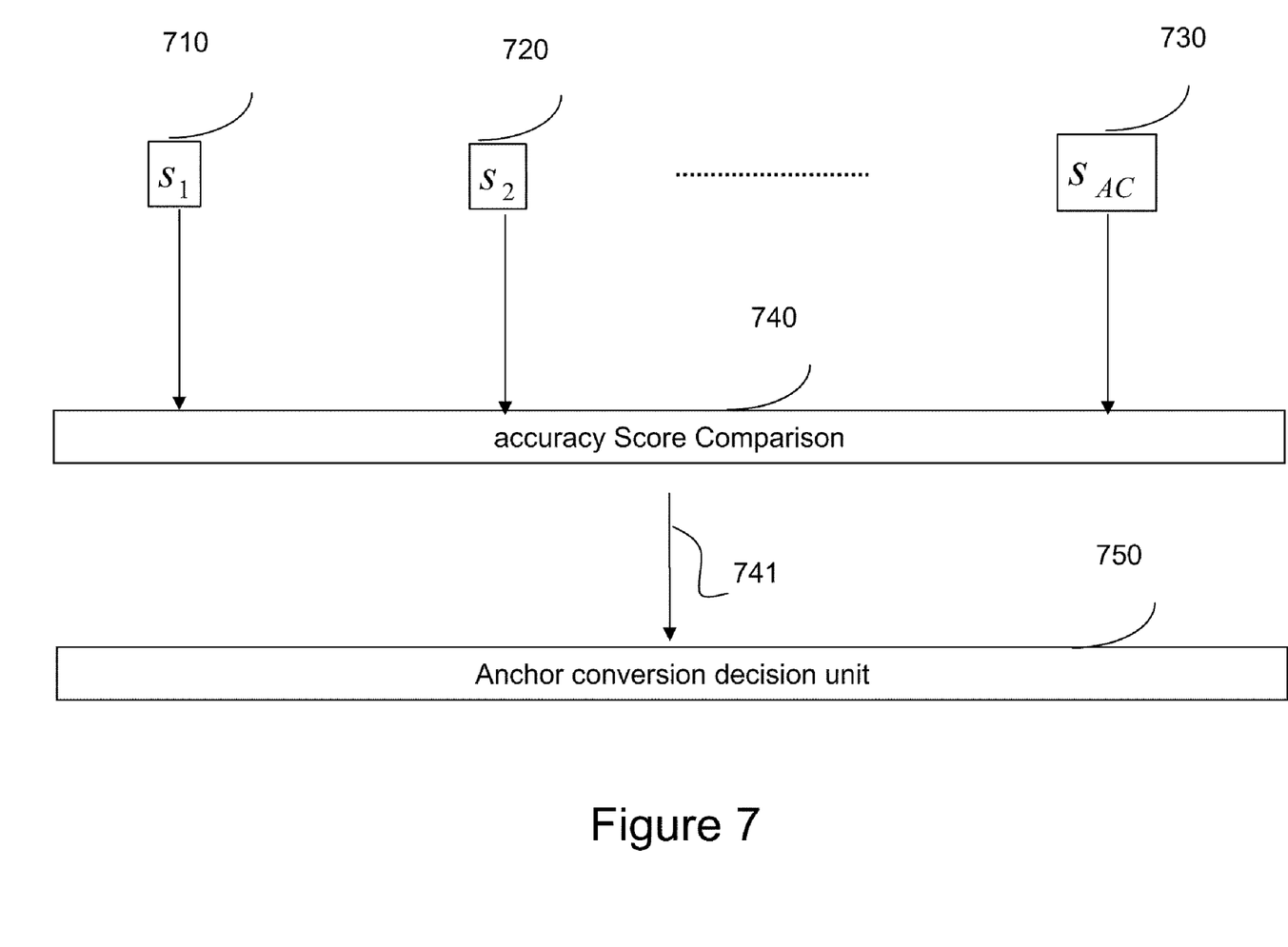
FIG. 7 is a block diagram of converting into a target node to an anchor node according to embodiments of the invention.

As shown in FIG. 7, the accuracy scores {710, 720, 730} of the target nodes are compared 740. The identity of the target node with the minimum accuracy score 741 is passed to the anchor conversion decision unit 750, and the anchor is converted to an anchor. In other words, target $n_c$ that satisfies Equation (10) is converted according to $$n_c = \underset{n}{\operatorname{argmin}} J_n(\hat{x}_t, \hat{y}_t), \quad (10)$$

where min is a function that returns a minimum.

Estimates for all other target nodes are discarded. After successfully converted the target to an anchor, the node $n_c$ can be used as an anchor for localizing other nodes.

A next node can be selected for conversion if that node has at least three adjacent anchor nodes. The localization information is disseminated across the network until all nodes have been converted to anchor nodes. We use as many anchors as possible when localizing a target node. By increasing the number of anchors, the accuracy of estimated location improves.

Refining Location Estimates

After all nodes in the network are localized and converted to anchors, the locations can be refined to final location estimates by using the locations of all nodes in another round of localization. This process can be repeated until a termination condition is met, e.g., the locations remain stable, or a predetermined number of iterations, to make the network adaptive and equally suitable for applications where efficiency is of paramount importance with some tolerance for accuracy and, on the other hand, the applications where accuracy is highly desirable with some relaxation for efficiency constraints.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for localizing a set of nodes in a wireless network including a target node having unknown location and a set of anchor nodes having known locations, comprising a processor in the target node for performing step of the method, the steps comprising:

partitioning the set of anchor nodes into subsets of anchor nodes, wherein each subset has at least three anchor nodes;

measuring, from the target node, a distance to each of anchor nodes in each subset;

estimating, for each subset, an estimated location of the target node based on the distances to the anchor nodes in the subset;

applying a geometric constraint to each estimated location to determine valid locations;

applying a filter to the valid locations to determine filtered locations; and averaging the filtered locations to determine an initial estimate of the location.

2. The method of claim 1, wherein the geometric constraint is an angle to each anchor node being greater than a predetermined threshold.

3. The method of claim 1, wherein the filter is non-linear filter.

4. The method of claim 1, wherein coordinates of the filtered locations are averaged independently.

5. The method of claim 1, wherein there are a set of target nodes, and the steps of the method are performed independently in each target node, and further comprising:

converting each target node to one of the anchor nodes if the initial estimate is obtained.

6. The method of claim 4, further comprising:

applying an objective function to the initial estimates of the locations to determine corresponding final locations.

7. The method of claim 4, further comprising:

repeating the steps until a termination condition met to obtain refined location.

8. The method of claim 1, wherein the distance between the target node and each anchor node i is $r_{it}$, and the estimated location is $$Hx = b, \quad \text{wherein}$$

$$\hat{x}^{(0,m)} = \begin{bmatrix} \hat{x}_t^{(0)} \\ \hat{y}_t^{(0)} \end{bmatrix} = (H_m^T H_m)^{-1} H_m^T b_m,$$

wherein the superscripts and subscripts indicate the estimated locations $$H_m = \begin{bmatrix} x_i - \frac{x_i + x_j + x_k}{3} & y_i - \frac{y_i + y_j + y_k}{3} \\ x_j - \frac{x_i + x_j + x_k}{3} & y_j - \frac{y_i + y_j + y_k}{3} \\ x_k - \frac{x_i + x_j + x_k}{3} & y_k - \frac{y_i + y_j + y_k}{3} \end{bmatrix}, \text{ and}$$

-continued $$b_m = \frac{1}{2} \begin{bmatrix} \left(x_i^2 - \frac{1}{3}\begin{pmatrix} x_i^2 + \\ x_j^2 + \\ x_k^2 \end{pmatrix}\right) + \left(y_i^2 - \frac{1}{3}\begin{pmatrix} y_i^2 + \\ y_j^2 + \\ y_k^2 \end{pmatrix}\right) - \hat{r}_{it}^2 + \frac{1}{3}\begin{pmatrix} \hat{r}_{it}^2 + \\ \hat{r}_{jt}^2 + \\ \hat{r}_{kt}^2 \end{pmatrix} \\ \left(x_j^2 - \frac{1}{3}\begin{pmatrix} x_i^2 + \\ x_j^2 + \\ x_k^2 \end{pmatrix}\right) + \left(y_j^2 - \frac{1}{3}\begin{pmatrix} y_i^2 + \\ y_j^2 + \\ y_k^2 \end{pmatrix}\right) - \hat{r}_{jt}^2 + \frac{1}{3}\begin{pmatrix} \hat{r}_{it}^2 + \\ \hat{r}_{jt}^2 + \\ \hat{r}_{kt}^2 \end{pmatrix} \\ \left(x_k^2 - \frac{1}{3}\begin{pmatrix} x_i^2 + \\ x_j^2 + \\ x_k^2 \end{pmatrix}\right) + \left(y_k^2 - \frac{1}{3}\begin{pmatrix} y_i^2 + \\ y_j^2 + \\ y_k^2 \end{pmatrix}\right) - \hat{r}_{kt}^2 + \frac{1}{3}\begin{pmatrix} \hat{r}_{it}^2 + \\ \hat{r}_{jt}^2 + \\ \hat{r}_{kt}^2 \end{pmatrix} \end{bmatrix}.$$

\* \* \* \* \*